April 2, 1963  D. J. VALLINO  3,084,113
METHODS OF AND APPARATUS FOR DEMINERALIZING WATER
Filed Feb. 1, 1960  4 Sheets-Sheet 1

INVENTOR.
Dominic J. Vallino

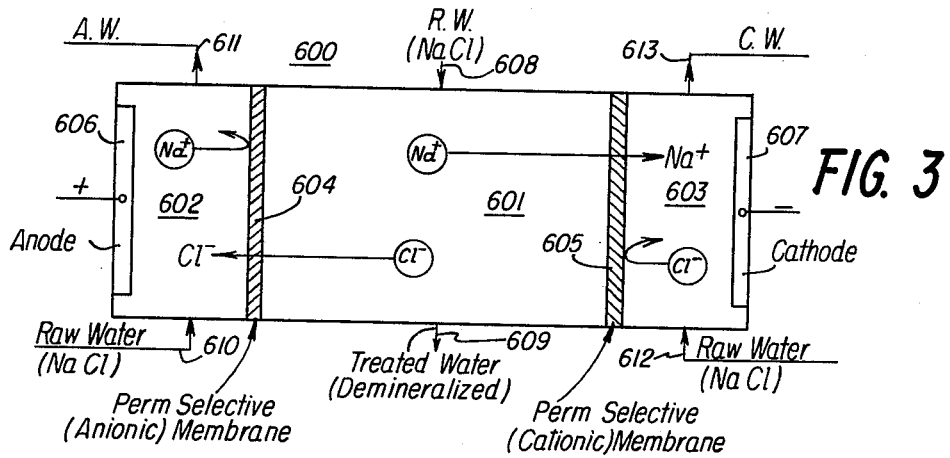
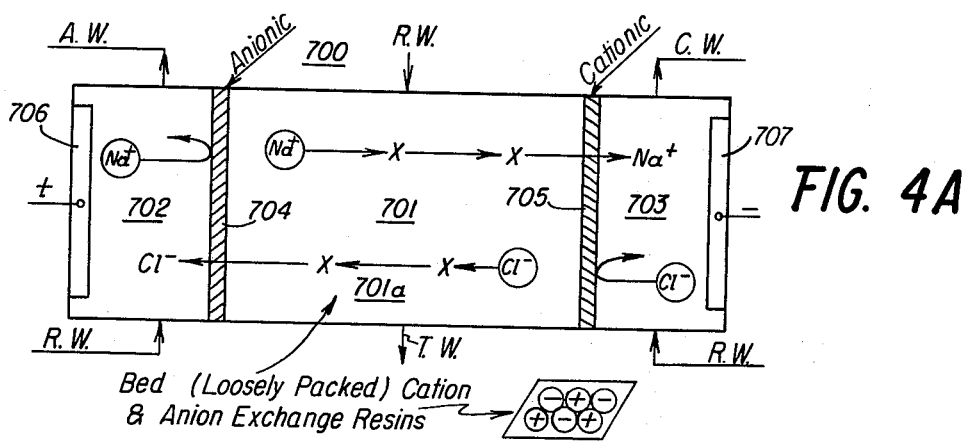
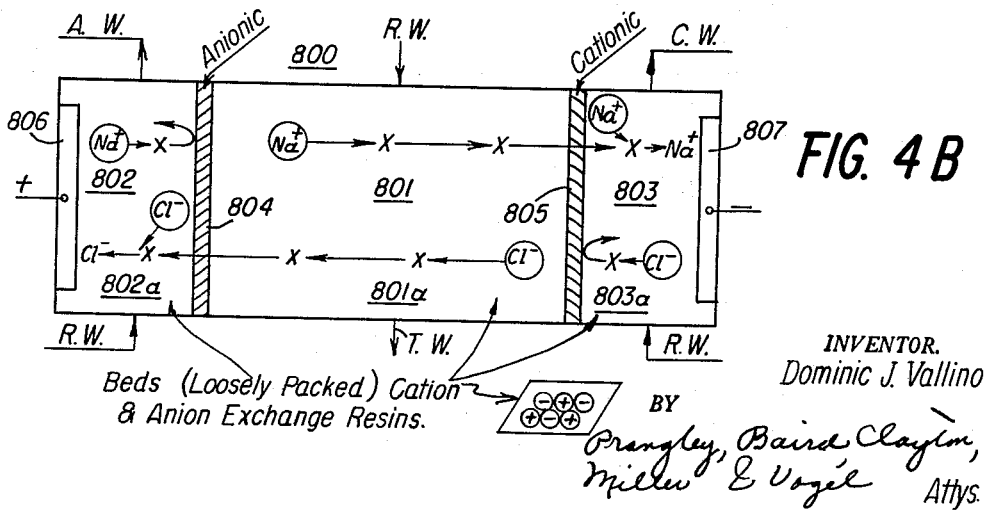

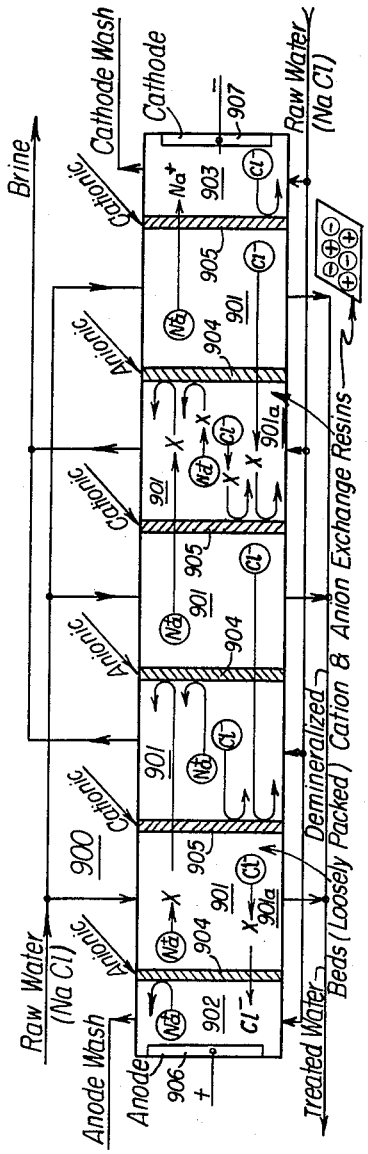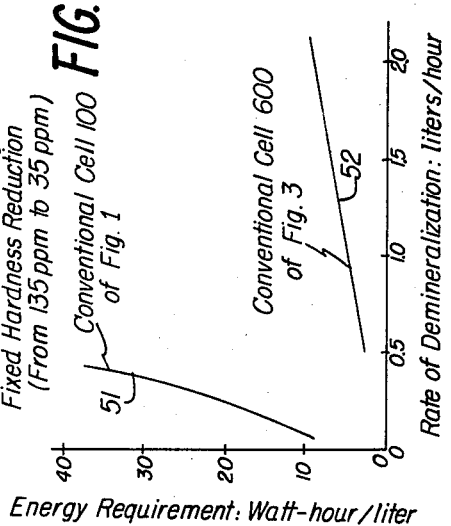

April 2, 1963  D. J. VALLINO  3,084,113
METHODS OF AND APPARATUS FOR DEMINERALIZING WATER
Filed Feb. 1, 1960  4 Sheets-Sheet 4

INVENTOR.
Dominic J. Vallino
BY
Attys.

United States Patent Office 3,084,113
Patented Apr. 2, 1963

3,084,113
METHODS OF AND APPARATUS FOR DEMINERALIZING WATER
Dominic J. Vallino, Cicero, Ill., assignor to General Electric Company, a corporation of New York
Filed Feb. 1, 1960, Ser. No. 5,914
16 Claims. (Cl. 204—131)

The present invention relates to methods of and apparatus for demineralizing water to modify the electrolytic concentrations thereof, and more particularly to such methods and apparatus that are especially adapted for use in the demineralization of raw water, whereby hard water may be rendered soft, and brackish water may be rendered palatable. The present application comprises a continuation-in-part of the copending application of Dominic J. Vallino, Serial No. 425,397, filed April 26, 1954, now abandoned.

In the demineralization of raw water, an electrolytic cell may be employed that conventionally comprises structure defining three adjacent chambers and including two barriers or membranes, one of the barriers constituting a common wall between the middle chamber and one of the end chambers, and the other barrier constituting a common wall between the middle chamber and the other end chamber, as well as an anode in the one end chamber and a cathode in the other end chamber. A first stream of raw water to be treated is passed through the middle chamber, and second and third streams of raw water are respectively passed through the second and third chambers. Finally, a direct electric current is passed from the anode to the cathode through the three streams of raw water and through the two barriers; whereby the cations and the anions of the electrolytes in the first stream of raw water are subjected to electrodialysis and migrate from the middle chamber respectively toward the cathode and toward the anode, and respectively diffuse through the two barriers into the two corresponding end chambers. Thus the first stream of raw water passing through the middle chamber is demineralized and substantial neutrality thereof is preserved, and, of course, the second stream of raw water comprises the anodic wash from the one end chamber and is rendered acidic, while the third stream of raw water comprises the cathodic wash from the other end chamber and is rendered alkaline.

In such a cell, the rate of demineralization of the raw water is dependent entirely upon the direct current passed from the anode to the cathode (Faraday's first law of electrolysis), while the power expended by the source of direct current supply is equivalent to the product of the voltage applied between the anode and the cathode and the current mentioned. Now while the theoretical power required to transport the ions at a fixed rate (comprising a given current) is very small, the actual power required is ordinarily quite large due to the high effective internal resistance of the cell; whereby this power difference effects undesirable heating of the raw water in the cell and results in a very low efficiency of operation of the cell.

Accordingly, it is a general object of the present invention to provide an improved method of and apparatus for demineralizing water that involves electrodialysis, wherein this action is carried out in an exceedingly simple and efficient manner.

Another object of the invention is to provide an improved method of and apparatus for demineralizing water that involves both electrodialysis and ion exchange, yet requires neither chemical regeneration of the ion exchange material employed nor special supervision.

Another object of the invention is to provide an improved method of and apparatus for treating raw water either to effect a reduction of the hardness thereof or to effect the extraction of salt therefrom, that involves both electrodialysis and ion exchange, wherein both the method and the apparatus are entirely automatic from the standpoint of the user, rendering such entirely practical and economical for home use.

A further object of the invention is to provide an improved method and apparatus of the character noted, wherein the cost of treating raw water is exceedingly low, the amount of gas evolved in the treatment is very small, and heating of the water is altogether inconsequential.

A further object of the invention is to provide an improved raw water treatment unit that is of compact and simple construction and arrangement and that is efficient and economical in operation.

The present invention is predicated upon the fundamental discovery that the provision of a porous ion exchange bed consisting essentially of a loosely packed mass of discrete particles of ion exchange material in the water-treatment or middle chamber of a conventional three-chamber electrolytic cell of the character described effects a drastic reduction in the effective internal resistance of the cell between the anode and the cathode thereof, without any reduction of the electrodialysis, so that the normally very high effective internal resistance loss of the cell is drastically reduced; whereby the efficiency of the cell is correspondingly increased, the amount of gas evolved in the operation of the cell is substantially reduced, and undesirable heating of the water in the cell is greatly minimized.

In the arrangement, the ion exchange bed comprises about equal parts by volume, although this is not critical, of synthetic organic polymeric cation exchange resin and synthetic organic polymeric anion exchange resin; the discrete particles of the two resins being of substantially bead-like character and being substantially heterogeneously dispersed and loosely packed in the bed so as to accommodate the ready passage therethrough of the first stream of raw water through the middle chamber.

Although the precise mechanism of the phenomenon is not altogether understood, it is entirely distinct from the normal ion exchange action of such a bed, since the phenomenon is independent of the regeneration level of the bed and may be fully realized when the bed is completely exhausted in the usual chemical sense. In fact, in carrying out the method of the present invention, it is suggested that the ion exchange bed that is placed in the middle chamber of the cell might just as well be initially completely exhausted, as it will reach this condition anyway after operation of the cell during a short time interval in the demineralization of raw water, and since the desired action is in no way dependent upon the regeneration level of the resins in the bed.

Returning now to the phenomenon mentioned above, it is postulated that the ion exchange particles in the bed serve as solid poly-electrolytes for the conduction of the cations and the anions of the electrolytes in the raw water contained in the middle chamber of the cell, as these ions are transported from the middle chamber during the electrodialysis in opposite directions respectively toward the cathode and toward the anode and respectively diffuse through the two barriers into the respective cathode chamber and anode chamber of the cell; whereby the cations and the anions perhaps undergo a great multiplicity of successive exchanges involving a considerable number of the individual ion exchange particles in the bed in the transportation thereof from the middle chamber; which mechanism may be visualized as like the mode employed in playing the child's game of "musical chairs." This hypothesis is suggested as this mechanism satisfies Faraday's first law of electrolysis and accounts for the drastic reduction in the effective internal resistance of the cell, as it is surmised that the energy loss incident to the successive transfer of the ions in this mechanism is indeed small compared to the energy loss incident to the equivalent migration of an equivalent number of ions in raw water, since in the ordinary migration mechanism the energy lost through random collision between the ions and the water molecules must be considerable and also the migrating ions must expend substantial work upon these dipolar molecules in passing therethrough.

In any case, and without reference to the particular mechanism that must be involved in the present invention, the arrangement of the porous ion exchange bed in the middle chamber of the cell is productive of the phenomenon mentioned; whereby the operating efficiency of the cell is drastically increased; and it is noted that the improvement is applicable to a wide variety of such cells employing barriers either of the ordinary permeable type or of the perm-selective or permionic type, as disclosed more fully hereinafter.

Further features of the invention pertain to the particular arrangement of the steps of the method and of the elements of the electrolytic cell, whereby the above-outlined and additional operating features thereof are attained.

The invention, both as to its organization and method of operation, together with further objects and advantages thereof, will best be understood by reference to the following specification taken in connection with the accompanying drawings, in which:

FIG. 3 is a diagrammatic illustration of a conventional electrolytic cell and of a second type that may be employed in the treatment of electrolytic solutions to modify the electrolytic concentrations thereof;

FIG. 4A is a diagrammatic illustration of a modified form of the electrolytic cell shown in FIG. 3 and embodying the present invention;

FIG. 4B is a diagrammatic illustration of another modified form of the electrolytic cell shown in FIG. 3 and embodying the present invention;

FIG. 4C is a diagrammatic illustration of a further modified form of the electrolytic cell shown in FIG. 3 and embodying the present invention;

FIG. 7 is a graphic illustration of the performance characteristics of the two electrolytic cells respectively shown diagrammatically in FIGS. 1 and 3; and FIG. 8 is a graphic illustration of the performance characteristics of the four electrolytic cells respectively shown diagrammatically in FIGS. 3, 4A and 2A.

Figure 1:
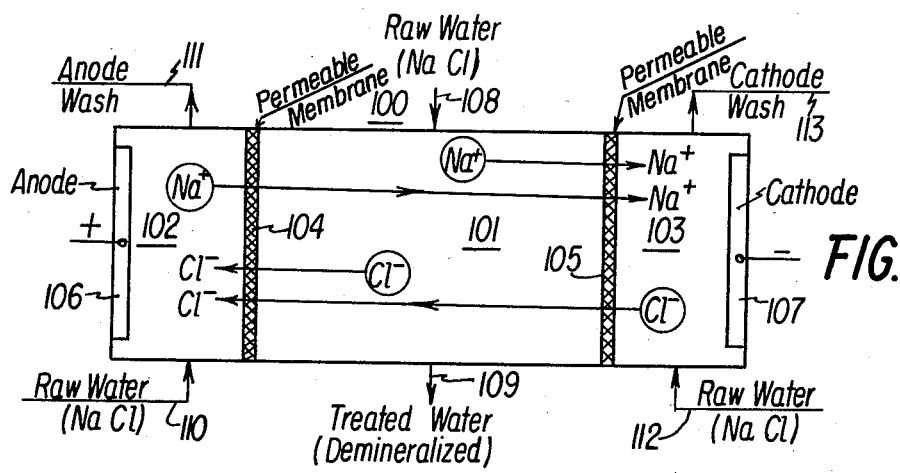
FIGURE 1 is a diagrammatic illustration of a conventional electrolytic cell of a first type that may be employed in the treatment of electrolytic solutions to modify the electrolytic concentrations thereof.

Referring now to FIG. 1 of the drawings, there is illustrated a conventional electrolytic cell 100 of a first type (Type I) that may be employed in the demineralization of water and particularly in the treatment of hard water to effect softening thereof or brackish water to effect desalting thereof. Entirely for the purpose of explanation, the cell 100 is illustrated diagrammatically as being employed in the treatment of brackish water containing NaCl. More particularly, the cell 100 comprises structure defining a middle or water-treatment chamber 101, a first end or anode chamber 102 and a second end or cathode chamber 103, the chambers 101 and 102 being separated by a common wall or barrier in the form of a permeable membrane 104, the chambers 101 and 103 being separated by a common wall or barrier in the form of a permeable membrane 105, as well as an anode 106 arranged in the anode chamber 102, and a cathode 107 arranged in the cathode chamber 103. In the cell 100, the barriers 104 and 105 may be formed of a wide variety of materials, such as clay products, textile fabrics impregnated with suitable insoluble fillers, etc. For example, a fabric formed essentially of woven or knitted cotton yarn or synthetic fiber and impregnated with cellulose acetate, collodion, etc., may be employed; and specifically, a twill woven of the synthetic fiber comprising a linear polyamide of the type obtained by the polymerization of a diamine with a dibasic carboxylic acid and sold under the name "nylon" and provided with an 8% cellulose acetate coating has been found to be particularly suitable.

In the system, a first stream of raw water to be treated may be conducted into the top of the middle chamber 101 via a conduit 108, and therethrough into contact with the barriers 104 and 105, and demineralized water may be conducted from the bottom of the middle chamber 101 via a conduit 109; a second stream of raw water may be conducted into the bottom of the end chamber 102 via a conduit 110, and therethrough into contact with the barrier 104 and the anode 106, and the resulting anode wash may be conducted from the top of the end chamber 102 via a conduit 111; and a third stream of raw water may be conducted into the bottom of the end chamber 103 via a conduit 112 and therethrough into contact with the barrier 105 and the cathode 107, and the resulting cathode wash may be conducted from the top of the end chamber 103 via a conduit 113.

In the operation of the cell 100, a source of direct voltage is applied between the anode 106 and the cathode 107, so that a direct electric current is passed from the anode 106 to the cathode 107 through the three streams of raw water mentioned and through the two barriers 104 and 105, whereby the first stream of raw water passing through the middle chamber 101 is demineralized by electrodialysis. More particularly, as illustrated, the cations ($Na^+$) and the anions ($Cl^-$) respectively migrate toward the right and toward the left from the middle chamber 101, and respectively diffuse through the barriers 105 and 104 into the corresponding end chambers 103 and 102; whereby the cations migrating in the end chamber 103 toward the cathode 107 are swept along with the third stream of raw water comprising the cathode wash, rendering the same alkaline, and the anions migrating in the end chamber 102 toward the anode 106 are swept along with the second stream of raw water comprising the anode wash, rendering the same acidic. Of course, considerable hydrogen gas is evolved adjacent to the cathode 107 and proceeds to the exterior along with the cathode wash; and likewise, some chlorine and oxygen gases are evolved adjacent to the anode 106 and proceed to the exterior along with the anode wash.

In addition to the desirable migrations of the cations and the anions described above, the cations entering the end chamber 102 also migrate in an undesirable manner through the barrier 104 into the middle chamber 101, and similarly, the anions entering the end chamber 103 migrate in an undesirable manner through the barrier 105 into the middle chamber 101; which migrations of these ions into the middle chamber 101 are deleterious with respect to the demineralization of the raw water therein.

While this conventional cell 100 effects demineralization of raw water, the efficiency thereof is exceedingly low due fundamentally to the high effective internal resistance thereof; whereby there is considerable undesirable heating of the water therein, and substantial undesirable evolution of gases therefrom. Accordingly, this conventional electrolytic cell 100 has only limited utility for the present purposes due principally to the exceedingly low efficiency of operation thereof.

Figure 2A:
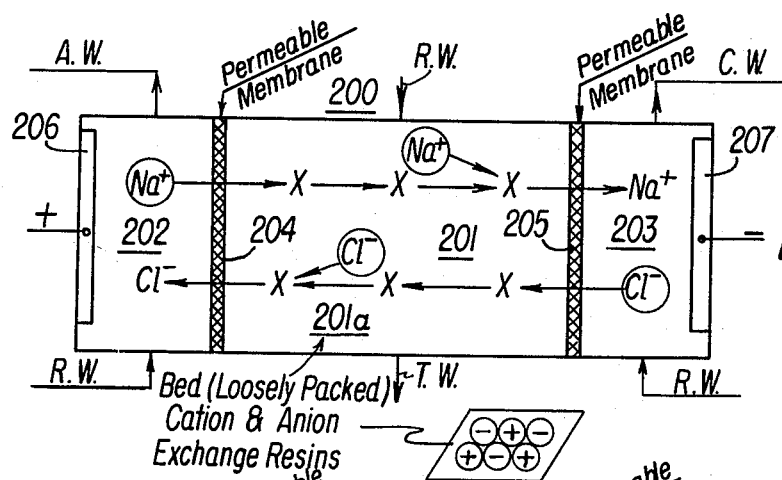
FIG. 2A is a diagrammatic illustration of a modified form of the electrolytic cell shown in FIG. 1 and embodying the present invention.

Referring now to FIG. 2A, there is illustrated a modified form of the electrolytic cell 200, embodying the features of the present invention, the electrolytic cell 200 being identical to the conventional electrolytic cell 100, with the exception that there is provided in the middle chamber 201 thereof a porous ion exchange bed 201a that preferably substantially completely fills the middle chamber 201 from bottom-to-top and from side-to-side thereof. The porous ion exchange bed 201a essentially comprises a loosely packed mass of first discrete particles of cation exchange material (preferably a synthetic organic polymeric cation exchange resin) and of second discrete particles of anion exchange material (preferably a synthetic organic polymeric anion exchange resin), the two types of particles mentioned being heterogeneously mixed (about 50%–50% by wet volume) in the mass of the bed 201a; whereby this bed is usually referred to hereinafter as being a "mixed resin" bed; and whereby the mixed resin bed 201a of the proportions noted has a cation exchange capacity and an anion exchange capacity that are substantially equivalent. Also the porosity of this mixed resin bed 201a is such that it accommodates the ready passage therethrough of the first stream of raw water that is to be demineralized in the middle chamber 201.

More particularly, this cation exchange resin is of bead-like formation and may comprise the strong-acid resin sold by Rohm and Haas under the name: "Amberlite IR–120"; and this anion exchange resin is of bead-like formation and may comprise the strong-base resin sold by Rohm and Haas under the names "Amberlite IRA–400" and "Amberlite IRA–410." A cation exchange resin of the type specified essentially comprises a stable insoluble synthetic organic polymer, active acidic functional groups chemically bonded thereto and dissociable into free mobile cations to impart a negative charge to the polymer, and water in gel relationship with the polymer. Similarly, an anion exchange resin of the type specified essentially comprises a stable insoluble synthetic organic polymer, active basic functional groups chemically bonded thereto and dissociable into free mobile anions to impart a positive charge to the polymer, and water in gel relationship with the polymer. The active acidic functional groups attached to the associated organic polymer are oriented with respect to the interfaces thereof so as to be partially or completely dissociable in the internal gel water into fixed negative ions linked to the polymer and into mobile exchangeable positive ions; and similarly, the active basic functional groups attached to the associated organic polymer are oriented with respect to the interfaces thereof so as to be partially or completely dissociable in the internal gel water into fixed positive ions linked to the polymer and into mobile exchangeable negative ions.

Typical such polymers to which active acidic functional groups may be attached include: phenol-aldehyde resins, polystyrene-divinylbenzene copolymers, and the like; and such suitable active acidic functional groups include:

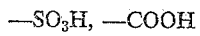

—SO$_3$H, —COOH and the like; —SO$_3$H being usually preferred because of its high dissociation constant. Typical such polymers to which active basic functional groups may be attached include: urea-formaldehyde resins, melamine-formaldehyde resins, polyalkylene-polyamine-formaldehyde resins, and the like; and such suitable active basic functional groups include: quaternary ammonium hydroxides, amino groups, the guanidyl group, the dicyanodiamidine group, and like organic nitrogen-containing basic groups; the quaternary ammonium hydroxide groups, the guanidine and the dicyanodiamidine residue being usually preferred because of their high dissociation constants. Normally the water in gel relationship with the polymer should be present in an amount of at least 15% of the weight of the dry resin.

The overall operation of the cell 200 is generally the same as that described in conjunction with the cell 100 in that the three streams of raw water are conducted through the respective chambers 201, 202 and 203, and the source of direct voltage is applied between the anode 206 and the cathode 207; whereby the first stream of raw water is demineralized in the middle chamber 201. However, the specific mode of operation of the cell 200, as well as the particular method involved in the operation thereof, is entirely different from that of the cell 100, as a consequence of the provision of the mixed resin bed 201a in the middle chamber 201; and specifically, the effective internal resistance of the cell 200 is drastically reduced, without any reduction in the electrodialysis; whereby the direct voltage that must be applied between the anode 206 and the cathode 207 in order to obtain the passage of a given direct electric current from the anode 206 to the cathode 207, through the three streams of raw water mentioned and through the two barriers 204 and 205 and the mixed resin bed 201a, is drastically reduced. Now, since the rate of demineralization of the raw water in the first stream mentioned is dependent entirely upon the direct current passing from the anode 206 to the cathode 207, it follows that the power requirement of the cell 200 is drastically reduced, thereby correspondingly increasing the efficiency of operation thereof (all with respect to the conventional cell 100). Not only does this proposition establish that the provision of the mixed resin bed 201a in the middle chamber 201 drastically reduces the effective internal resistance of the cell 200, but this fact is also established experimentally, as explained more fully hereinafter, by a corresponding reduction in the heating of the raw water in the cell 200, as well as by a considerable reduction in the amount of gases that are evolved thereby incident to the operation thereof.

Although the phenomenon is not altogether understood, it is surmised that the resins in the mixed resin bed 201a constitute solid poly-electrolytes for the transportation of the ions through the middle chamber 201; and specifically, it is visualized, as illustrated, that the cations are involved in a great multiplicity of exchanges with a considerable number of the individual cation exchange particles in their movements toward the cathode 207, and that the anions are involved in a great multiplicity of exchanges with a considerable number of the individual anion exchange particles in their movements toward the anode 206; the mechanism involved being visualized as like the mode employed in playing the child's game of "musical chairs." In this mechanism it is suggested that the energy required to effect the successive ion exchanges of a great number of the ions in the mixed resin bed 201a and the consequent transportation of a given number of the ions through the middle chamber 201 of the cell 200 is very small compared to the energy required to effect the direct migration of the same given number of ions through the middle chamber 101 of the cell 100, due fundamentally to the fact that in the direct migration of the ions there must be a great amount of energy lost through random collision by the ions with water molecules and the ions must expend a great amount of work upon these dipolar molecules in passing therethrough.

In any case, and without reference to the exact mechanism involved, the inventive cell 200 constitutes a dramatic improvement over the conventional cell 100, and most emphatically the mode of operation of the cell 200 is entirely different from that of the cell 100; whereby the method of demineralizing water described in conjunction with the cell 200 is entirely different from that described in conjunction with the cell 100, vastly more being involved than the improvement of the structure of the cell 200 with respect to that of the cell 100.

Figure 2B:
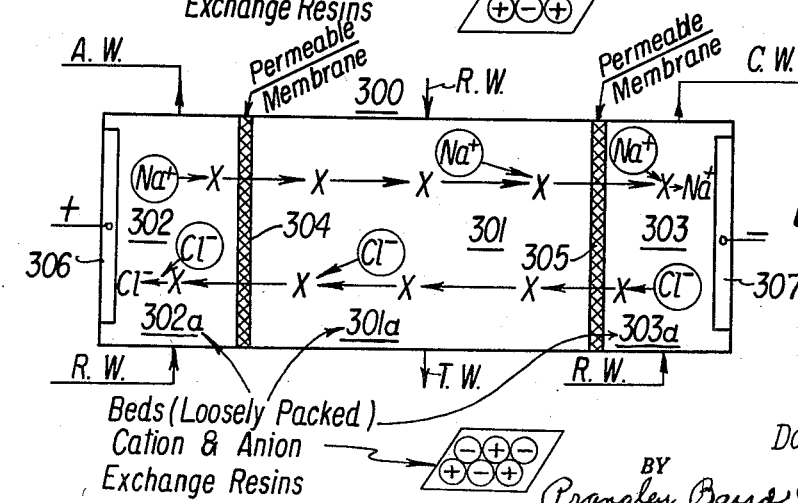
FIG. 2B is a diagrammatic illustration of another modified form of the electrolytic cell shown in FIG. 1 and embodying the present invention.

Referring now to FIG. 2B, there is illustrated another modified form of the electrolytic cell 300, embodying the features of the present invention, the electrolytic cell 300 being identical to the electrolytic cell 200, with the exception that there are respectively provided in the two end chambers 302 and 303 thereof two porous ion exchange beds 302a and 303a, that may be identical to the porous ion exchange bed 301a that is provided in the middle chamber thereof. In other words, the three mixed resin beds 301a, 302a and 303a respectively provided in the three chambers 301, 302 and 303 preferably substantially completely fill the respective chambers named from top-to-bottom and from side-to-side thereof, and respectively accommodate the passage therethrough of the corresponding ones of the three streams of raw water, previously mentioned.

Furthermore, the mixed resin bed 302a arranged in the chamber 302 is disposed in contact with both the anode 306 and the adjacent side of the associated barrier 304; and specifically, the bed 302a is disposed between the anode 306 and the barrier 304 and in embedding relation with respect to the anode 306. Similarly, the mixed resin bed 303a arranged in the chamber 303 is disposed in contact with both the cathode 307 and the adjacent side of the associated barrier 305; and specifically, the bed 303a is disposed between the cathode 307 and the barrier 305 and in embedding relation with respect to the cathode 307. The bed 301a arranged in the chamber 301 is disposed in contact with the adjacent surfaces of the barriers 304 and 305.

The overall operation of the cell 300 is specifically the same as that described in conjunction with the cell 200; however, a further reduction in the effective internal resistance thereof is realized by the provision of the two additional mixed resin beds 302a and 303a in the two respective end chambers 302 and 303, and it is visualized that the mechanism of each of the mixed resin beds 301a, 302a and 303a is the same as that previously described as involving the successive ion exchanges (the musical chair explanation).

In passing, it is noted that in the cell 300, the ion exchange bed 302a provided in the anode chamber 302 may, instead of consisting of the previously described mixed resins, consist entirely of particles of the synthetic organic polymeric anion exchange resin type previously described; and similarly, the ion exchange bed 303a provided in the cathode chamber 303 may, instead of consisting of the previously described mixed resins, consist entirely of particles of the synthetic organic polymeric cation exchange resin type, previously described.

A modified form of the cell 300 of FIG. 2B has been provided in which the resin beds 302a and 303a are arranged in the end chambers 302 and 303, respectively, and in which the resin bed 301a has been omitted from the middle or treatment chamber 301; and it has been found that this modified form of the cell 300 constitutes an important improvement over the conventional cell 100 of FIG. 1 due to the provision of the two resin beds 302a and 303a, and notwithstanding the elimination of the resin bed 301a. Specifically, this modified form of the cell 300 is highly satisfactory in operation and exhibits a substantially improved operating efficiency over the conventional cell 100 of FIG. 1, due entirely to the provision of the resin beds 302a and 303a in the respective end chambers 302 and 303. It is believed that this improved operating efficiency noted results from the substantially decreased internal resistance of this modified form of the cell 300, with respect to the conventional cell 100, together with the improvements concerning a better distribution of the effective anode 306 and a better distribution of the effective cathode 307, and the consequent increase in the voltage gradient present between the barriers 304 and 305 and across the middle chamber 301 when a predetermined reference voltage is impressed between the conductors respectively extending to the anode 306 and to the cathode 307.

Referring now to FIG. 3 of the drawings, there is illustrated a conventional electrolytic cell 600 of a second type (Type II) that may be employed in the treatment of electrolytic solutions to modify the electrolytic concentrations thereof and particularly in the treatment of hard water to effect softening thereof or brackish water to effect desalting thereof. Entirely for the purpose of explanation, the cell 600 is illustrated diagrammatically as being employed in the treatment of brackish water containing NaCl. More particularly, the cell 600 comprises structure defining a middle or water-treatment chamber 601, a first end or anode chamber 602 and a second end or cathode chamber 603, the chambers 601 and 602 being separated by a common wall or barrier in the form of a perm-selective (anionic) membrane 604, the chambers 601 and 603 being separated by a common wall or barrier in the form of a perm-selective (cationic) membrane 605, as well as an anode 606 arranged in the anode chamber 602, and a cathode 607 arranged in the cathode chamber 603. In the cell 600, the anionic barrier 604 and the cationic barrier 605 may be of commercially available forms and specifically they may be of the two respective types shown in U.S. Patent No. 2,636,851, granted on April 28, 1953, to Walter Juda and Wayne A. McRae.

For example, the cationic barrier 604 may be of the type sold by Rohm and Haas under the name "Amberplex C-1" and essentially comprising a suitable supporting resinous matrix, or the like, carrying a suitable stable insoluble synthetic organic polymeric cation exchange resin of the general character of that previously set forth; and the anionic barrier 605 may be of the type sold by Rohm and Haas under the name "Amberplex A-1" and essentially comprising a suitable resinous matrix, or the like, carrying a suitable stable insoluble synthetic organic polymeric anion exchange resin of the general character of that previously set forth.

In the system, a first stream of raw water to be treated may be conducted into the top of the middle chamber 601 via a conduit 608 and therethrough into contact with the barriers 604 and 605, and demineralized water may be conducted from the bottom of the middle chamber 601 via a conduit 609; a second stream of raw water may be conducted into the bottom of the end chamber 602 via a conduit 610 and therethrough into contact with the barrier 604 and the anode 606, and the resulting anode wash may be conducted from the top of the end chamber 602 via a conduit 611; and a third stream of raw water may be conducted into the bottom of the end chamber 603 via a conduit 612 and therethrough into contact with the barrier 605 and the cathode 607, and the resulting cathode wash may be conducted from the top of the end chamber 603 via a conduit 613.

In the operation of the cell 600, a source of direct voltage is applied between the anode 606 and the cathode 607, so that a direct electric current is passed from the anode 606 to the cathode 607 through the three streams of raw water mentioned and through the two barriers 604 and 605, whereby the first stream of raw water passing through the middle chamber 601 is demineralized by electrodialysis. More particularly, as illustrated, the cations ($Na^+$) and the anions ($Cl^-$) respectively migrate toward the right and toward the left from the middle chamber 601, and respectively diffuse through the barriers 605 and 604 into the corresponding end chambers 603 and 602; whereby the cations migrating in the end chamber 603 toward the cathode 607 are swept along with the third stream of raw water comprising the cathode wash, rendering the same alkaline, and anions migrating in the end chamber 602 toward the anode 606 are swept along with the second stream of raw water comprising the anode wash, rendering the same acidic. Of course, some hydrogen gas is evolved adjacent to the cathode 607 and proceeds to the exterior along with the cathode wash; and likewise, some chlorine and oxygen gases are evolved adjacent to the anode 606 and proceed to the exterior along with the anode wash.

In the arrangement, the perm-selective barriers 605 and 604 permit the respective selective diffusion of the cations and the anions therethrough in the desired manner; and moreover, the perm-selective barriers 605 and 604 respectively selectively block the diffusion therethrough of the anions from the cathode chamber 603 and the cations from the anode chamber 602. Thus, the perm-selective barriers 604 and 605 prevent the undesirable migrations into the middle chamber 601 of the cations entering the anode chamber 602 and of the anions entering the cathode chamber 603; whereby the overall efficiency of operation of the second type of conventional cell 600 is considerably higher than that of the first type of conventional cell 100. Accordingly, this conventional cell 600 has considerable utility for the present purposes due to the moderate efficiency of operation thereof.

Referring now to FIG. 4A, there is illustrated a modified form of the electrolytic cell 700, embodying the features of the present invention, the electrolytic cell 700 being identical to the conventional electrolytic cell 600, with the exception that there is provided in the middle chamber 701 thereof a porous ion exchange bed 701a that preferably substantially completely fills the middle chamber 702 from bottom-to-top and from side-to-side thereof. The porous ion exchange bed 701a essentially comprises a loosely packed mass of first discrete particles of synthetic organic polymeric cation exchange resin of the character previously described and of second discrete particles of synthetic organic polymeric anion exchange resin of the character previously described, the two types of particles mentioned being heterogeneously mixed (about 50%–50% by wet volume) in the mass of the bed 701a to provide the mixed resin bed previously described. The porosity of this mixed resin bed 701a is such that it accommodates the ready passage therethrough of the first stream of raw water that is to be demineralized in the middle chamber 701.

The overall operation of the cell 700 is generally the same as that described in conjunction with the cell 600 in that the three streams of raw water are conducted through the respective chambers 701, 702 and 703, and the source of direct voltage is applied between the anode 706 and the cathode 707; whereby the first stream of raw water is demineralized in the middle chamber 701. However, the specific mode of operation of the cell 700, as well as the particular method involved in the operation thereof, is entirely different from that of the cell 600, as a consequence of the provision of the mixed resin bed 701a in the middle chamber 701; and specifically, the effective internal resistance of the cell 700 is drastically reduced, without any reduction in the electrodialysis; whereby the direct voltage that must be applied between the anode 706 and the cathode 707 in order to obtain the passage of a given direct electric current from the anode 706 to the cathode 707, through the three streams of water mentioned and through the two barriers 704 and 705 and the mixed resin bed 701a is drastically reduced. The specific mode of operation of the cell 700 is visualized, as illustrated, as employing the mechanism previously described in conjunction with the cell 200, and involving the successive ion exchanges (the musical chair explanation).

Referring now to FIG. 4B, there is illustrated another modified form of the electrolytic cell 800, embodying the features of the present invention, the electrolytic cell 800 being identical to the electrolytic cell 700, with the exception that there are respectively provided in the two end chambers 802 and 803 thereof, two porous ion exchange beds 802a and 803a that may be identical to the porous ion exchange bed 801a that is provided in the middle chamber 801 thereof. In other words, the three mixed resin beds 801a, 802a and 803a respectively provided in the three chambers 801, 802 and 803 preferably substantially completely fill the respective chambers named from top-to-bottom and from side-to-side thereof, and respectively accommodate the passage therethrough of the corresponding ones of the three streams of raw water previously mentioned. The overall operation of the cell 800 is specifically the same as that described in conjunction with the cell 700; however, a further reduction in the effective internal resistance thereof is realized by the provision of the two additional mixed resin beds 802a and 803a in the two respective end chambers 802 and 803, and it is visualized that the mechanism of each of the mixed resin beds 801a, 802a and 803a is the same as that previously described as involving the successive ion exchanges (the musical chair explanation).

In passing, it is noted that in the cell 800 the ion exchange bed 802a provided in the anode chamber 802 may, instead of consisting of the previously-described mixed resins, consist entirely of particles of the synthetic organic polymeric anion exchange resin type previously described, since the direct electric current from the anode 806 to the cathode 807 involves only anions in its passage through the anode chamber 802; and similarly, the ion exchange bed 803a provided in the cathode chamber 803 may, instead of consisting of the previously described mixed resins, consist entirely of particles of the synthetic organic polymeric cation exchange resin type previously described, since the direct electric current from the anode 806 to the cathode 807 involves only cations in its passage through the cathode chamber 803; whereas, of course, the direct electric current mentioned involves both cations and anions in its passage through the middle chamber 801.

A modified form of the cell 800 of FIG. 4B has been provided in which the resin beds 802a and 803a are arranged in the end chambers 802 and 803, respectively, and in which the resin bed 801a has been omitted from the middle or treatment chamber 801; and it has been found that this modified form of the cell 800 constitutes an important improvement over the conventional cell 600 of FIG. 3 due to the provision of the two resin beds 802a and 803a, and notwithstanding the elimination of the resin bed 801a. Specifically, this modified form of the cell 800 is highly satisfactory in operation and exhibits a substantially improved operating efficiency over the conventional cell 600 of FIG. 3, due entirely to the provision of the resin beds 802a and 803a in the respective end chambers 802 and 803. It is believed that this improved operating efficiency noted results from the substantially decreased internal resistance of this modified form of the cell 800, with respect to the conventional cell 600, together with the improvements concerning a better distribution of the effective anode 806 and a better distribution of the effective cathode 807, and the consequent increase in the voltage gradient present between the barriers 804 and 805 and across the middle chamber 801 when a predetermined reference voltage is impressed between the conductors respectively extending to the anode 806 and to the cathode 807.

Referring now to FIG. 4C, there is illustrated a further modified form of the electrolytic cell 900, embodying the features of the present invention, the electrolytic cell 900 being of the fundamental construction of that of the electrolytic cell 700, except that the number of chambers disposed between the anode chamber and the cathode chamber thereof has been increased so as to provide a plurality of such chambers disposed in tandem relation. More particularly, the cell 900 comprises structure defining a first end or anode chamber 902 and a second end or cathode chamber 903 and five intermediate chambers 901 arranged in tandem relation therebetween, odd ones of the intermediate chambers 901 constituting water-treatment chambers, and even ones of the intermediate chambers 901 constituting brine-collection chambers. Further, the structure mentioned comprises a series of alternate perm-selective anionic and perm-selective cationic barriers 904 and 905 comprising common walls between adjacent ones of the chambers 901. Specifically, as illustrated, the anode chamber 902 is separated from the adjacent first water-treatment chamber 901 disposed on the right-hand side thereof by the anionic barrier 904; this first water-treatment chamber 901 mentioned is separated from the adjacent first brine-collection chamber 901 disposed on the right-hand side thereof by the cationic barrier 905; this first brine-collection chamber 901 mentioned is separated from the adjacent second water-treatment chamber 901 disposed on the right-hand side thereof by the anionic barrier 904; this second water-treatment chamber 901 mentioned is separated from the adjacent second brine-collection chamber 901 disposed on the right-hand side thereof by the cationic barrier 905; this second brine-collection chamber 901 mentioned is separated from the adjacent third water-treatment chamber 901 disposed on the right-hand side thereof by the anionic barrier 904; and this third water-treatment chamber 901 mentioned is separated from the adjacent cathode chamber 903 disposed on the right-hand side thereof by the cationic barrier 905.

In one or more of the three water-treatment chambers 901 a mixed resin bed 901a of the character previously described is provided (in the first water-treatment chamber 901 as illustrated); and in one or more of the two brine-collection chambers 901 a mixed resin bed 901a of the character previously described is provided (in the second brine-collection chamber 901 as illustrated). It will be understood that only two of the mixed resin beds 901a have been illustrated entirely to facilitate the description and to emphasize that it is not necessary to provide one of the mixed resin beds 901a in each corresponding one of the five intermediate chambers 901 disclosed, although the provision of such a mixed resin bed 901a in each of the five intermediate chambers 901 is preferable.

In the system, three streams of raw water to be treated are conducted in parallel relation through the three water-treatment chambers 901 and four streams of raw water are conducted in parallel relation through the anode chamber 902, the cathode chamber 903 and the two brine-collection chambers 901.

In the operation of the cell 900, a source of direct voltage is applied between the anode 906 and the cathode 907, so that a direct electric current is passed from the anode 906 to the cathode 907 through the seven streams of raw water mentioned and through the six barriers 904 and 905 and through the two mixed resin beds 901a illustrated, all in series relation, whereby the three streams of raw water passing through the three water-treatment chambers 901 are demineralized by electrodialysis. The particular modes of migrations and successive exchanges of the various ions are illustrated and are considered to be entirely similar to those involved in the operation of the cell 700; and in the interest of brevity a complete description of these items is omitted.

Figure 5:
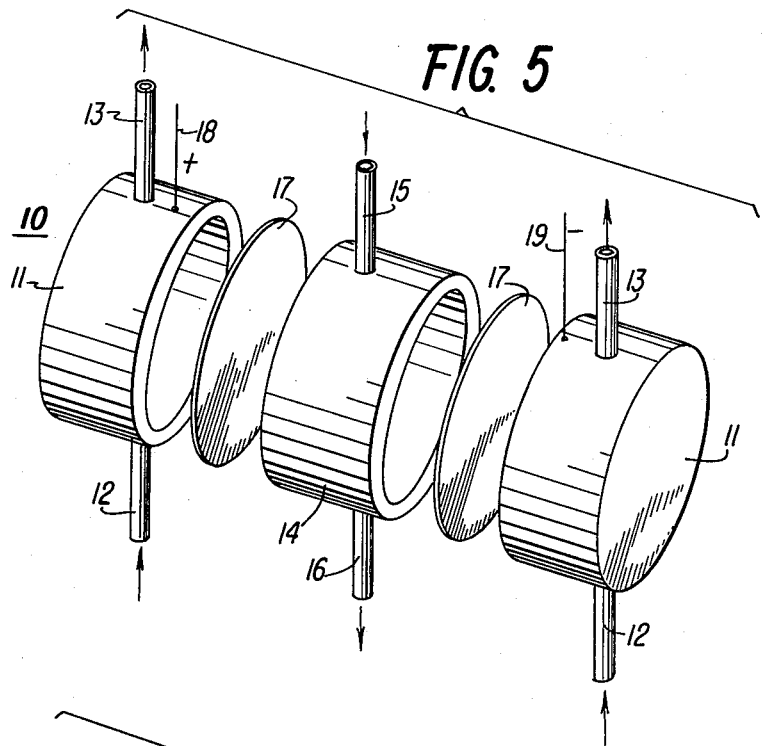
FIG. 5 is an exploded perspective view of a first structural form of an electrolytic cell in which the present invention may be incorporated.

Turning now to FIG. 5, there is illustrated one structural form of an electrolytic cell 10 that may be selectively assembled to produce any one of the seven electrolytic cells 100, etc., 900. More particularly, the electrolytic cell 10 comprises two identical substantially cup-shaped end members 11 provided with inlet and outlet conduits 12 and 13, at least one tubular member 14 provided with inlet and outlet conduits 15 and 16, at least two disk-like barriers 17, and securing means, not shown, for retaining in assembled relation the elements named. Finally, the cell 10 comprises an anode, not shown, arranged in the bottom end of the left-hand end member 11 and connected by a conductor 18 to the positive terminal of the source of direct current supply, as well as a cathode, not shown, arranged in the bottom end of the right-hand end member 11 and connected by a conductor 19 to the negative terminal of the source of direct current supply. In the arrangement, the members 11 and 14 may be formed of the thermoplastic molded resin of polymethylmethacrylate type sold under the name "Lucite"; and the barriers 17 may be either of the ordinary permeable type, or of the two respective perm-selective types, all as previously described. Also, in the assembly of the cell 10, rubber gaskets, not shown, are usually arranged between certain of the elments so as to insure that the various chambers defined therein are water-tight; and clamping mechanism, not shown, is provided for the purpose of retaining the elements in their assembled relation.

Now, in order to produce the composition electrolytic cell 100 of FIG. 1, it is only necessary to secure together the elements described of the cell 10, employing the permeable barriers 17; in order to produce the composite electrolytic cell 200 of FIG. 2A, it is only necessary to secure together the elements described of the cell 10, employing the permeable barriers 17, and to place within the intermediate member 14 the required mixed resin bed; in order to produce the composite electrolytic cell 600 of FIG. 3, it is only necessary to secure together the elements described of the cell 10, employing the two types of perm-selective barriers 17; and in order to produce the composite electrolytic cell 700 of FIG. 4A, it is only necessary to secure together the elements described of the cell 10, employing the two types of perm-selective barriers 17 and to place within the intermediate member 14 the required mixed resin bed. In view of the foregoing, it will be understood that the other composite electrolytic cells 300 and 900 may be appropriately produced from the elements of the cell 10; and in this connection, it is pointed out that in the production of the electrolytic cell 900, five of the intermediate members 14 are employed in conjunction with two of the end members 11 and three each of the two types of permselective barriers 17. Furthermore, it will be appreciated that the elements of the cell 10 may be arranged to produce other and a wide variety of electrolytic cells of the character described.

Figure 6:
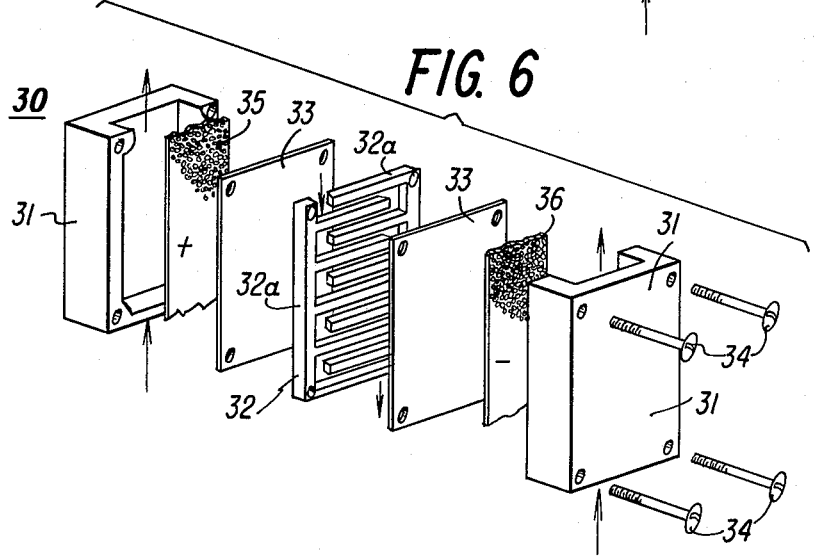
FIG. 6 is an exploded perspective view of a second structural form of an electrolytic cell in which the present invention may be incorporated.

Turning now to FIG. 6, there is illustrated another structural form of an electrolytic cell 30 that may be selectively assembled to produce any one of the seven electrolytic cells 100, etc., 900. More particularly, the electrolytic cell 30 comprises two identical hollow substantially rectangular end shells or members 31, at least one composite rectangular intermediate member 32, at least two rectangular barriers 33, and four screws 34 for retaining in assembled relation the elements named. Further, the cell 30 comprises an anode 35 that is arranged in the left-hand hollow end member 31 and connected to the positive terminal of the source of direct current supply, and a cathode 36 that is arranged in the right-hand hollow end member 31 and connected to the negative terminal of the source of direct current supply. In the arrangement, the composite intermediate member 32 comprises two individual comb-like parts 32a that, when properly assembled, define a substantially sinuous elongated passage or first chamber therethrough between the adjacent barriers 33; and the hollow members 31 are respectively provided with inlet and outlet passages communicating with the respective chambers formed therein. Moreover, the members 31, and the parts 32a of the composite intermediate member 32, may be formed of the resin "Lucite," as previously explained; while the barriers 33 may be either of the ordinary permeable type, or of the two respective perm-selective types, all as previously described. Finally, in the assembly of the cell 30, rubber gaskets, not shown, are usually arranged between certain of the elements so as to insure that the various chambers defined therein are water-tight; and the screws 34 passing through aligned openings formed in the members 31, the parts 32a and the barriers 33 comprise clamping mechanism for the purpose of retaining the elements in their assembled relation.

In view of the foregoing description of the selective assembly of the elements of the cell 10 of FIG. 5, it will be understood that in a similar manner the elements of the cell 30 of FIG. 6 may be selectively assembled to produce any one of the seven electrolytic cells 100, etc., 900, as previously noted; and in the interest of brevity, this matter is not repeated. In this connection, it is pointed out that the structure of the cell 30 is somewhat more advantageous than that of the cell 10 in that the arrangement of the parts 32a of the composite intermediate member 32 positively insures the passage of the water to be demineralized through the associated fixed elongated sinuous passage causing a more nearly uniform demineralization of adjacent portions of the stream of water undergoing the treatment.

In a water demineralization system employing either the electrolytic cell structure 10 of FIG. 5 or the electrolytic cell structure 30 of FIG. 6 and involving any one of the electrolytic cell arrangements 100, etc., 900, the various streams of water may be supplied through the different chambers employing appropriate upstanding columns, in a conventional manner, whereby the water that is to be treated may be percolated by gravity through the porous bed when it is provided in the middle chamber; however, it is preferable that the system comprise a gauge pressure feed arrangement of the general character of that disclosed in U.S. Patent No. 2,846,387, granted on August 5, 1958, to Edgar S. Stoddard. The Stoddard arrangement is particularly advantageous in the electrolytic cell arrangements 600, 700, 800 and 900 of FIGS. 3, 4A, 4B and 4C, respectively, and involving the fragile anionic and cationic membranes, since the Stoddard system involves water pressure regulating mechanism that prevents undesirable high water pressures upon these diaphragms.

In the foregoing description of the operation of the electrolytic cells 100, etc., 900, the demineralization was considered for the purpose of desalting brackish water, but it will be understood that the demineralization for the purpose of softening hard water is substantially the same; and in such case, the cells 100, etc., remove from the hard water undergoing the treatment the ions of the contained electrolytes, including such cations as: $Ca^{++}$, $Mg^{++}$, $Fe^{++}$, etc., and such anions as: $SO_4^-$, $Cl^-$, $NO_3^-$, $HCO_3^-$, etc. Hard water to be treated frequently contains a dissolved solids count of 250 p.p.m. and higher, comprising dissolved electrolytes yielding the cations and the anions named; whereby it is totally unsuitable for use in many industrial chemical processes and objectionable in carrying out such simple household processes as: washing clothes, washing dishes, etc. Moreover, such hard water is undesirable for drinking purposes, wasteful of detergent in washing operations, productive of stains and foreign deposits in cooking operations, productive of scale in water tanks and piping, etc.

Now in the practical demineralization of hard water, it is not necessary to remove all of the dissolved solids, but only to reduce the total dissolved solids to a tolerable value. For example, Chicago water is only moderately hard, containing about 135 p.p.m. of hardness ions (calculated as $CaCO_3$), and can be rendered altogether soft, from a practical standpoint, by reducing the content of these hardness ions to 35 p.p.m.; and hereinafter, a treatment that is productive of demineralization of Chicago water effecting a fixed reduction of the hardness ions content thereof from 135 p.p.m. to 35 p.p.m. is referred to as a "standard" water treatment.

Employing the electrolytic cell 10, shown in FIG. 5, wherein the internal diameter of the member 14 was 60 mm. (a cross-sectional area of 28 cm.²), a series of "standard" water treatment tests were conducted involving the two conventional cell arrangements of FIGS. 1 and 3, and involving the different inventive cell arrangements of FIGS. 2A, 4A, etc. First, it was discovered that with the conventional cell 100 of FIG. 1, the energy requirements (watt-hours/liter) were so great that it was impossible to obtain a treatment rate (liters/hour) that offered any promise of practical use, as shown by the curve 51 in FIG. 7, the energy requirement being greater than 40 watt-hours/liter at a treatment rate of less than 0.5 liter/hour; and that with the conventional cell 600 of FIG. 3, the energy requirements were merely excessive, as shown by the curves 52 in FIG. 7 and 61 in FIG. 8, the energy requirement being about 9.5 watt-hours/liter at a practical treatment rate of 2.0 liters/hour; it being considered that a treatment rate of 2.0 liters/hour was quite satisfactory employing the small cell 10 of the dimensions noted. Then it was discovered that with the inventive cell 200 of FIG. 2A, the energy requirements were quite modest, as shown by the curve 63 in FIG. 8, the energy requirement being about 2.6 watt-hours/liter at a treatment rate of 2.0 liters/hour; and that with the inventive cell 700 of FIG. 4A the energy requirements were very modest, as shown by the curve 62 in FIG. 8, the energy requirement being about 3.4 watt-hours/liter at a treatment rate of 2.0 liters/hour.

Recapitulating, the energy requirements of these different electrolytic cells (produced from the cell structure 10) at a treatment rate of 2.0 liters/hour were as follows:

| Cell | Description | Energy Required (Watt-hours/liter) |
| --- | --- | --- |
| 100 | Conventional Type I | Impossible. |
| 200 | Modified Type I | 2.6. |
| 600 | Conventional Type II | 9.5. |
| 700 | Modified Type II | 3.4. |

These tests present the peculiar facts, as indicated by the above tabulation, that while the conventional Type II cell 600 of FIG. 3 constitutes a vast improvement over the conventional Type I cell 100 of FIG. 1, the modified Type II cell 700 of FIG. 4A is not nearly so advantageous as the modified Type I cell 200 of FIG. 2A, although the modified Type II cell 700 of FIG. 4A constitutes a marked improvement over the conventional Type II cell 600 of FIG. 3. It is indeed a fortunate discovery that the modified Type I cell 200 is far more efficient than the modified Type II cell 700 for the present purposes, since all cells of Type II are subject to some very severe criticisms, as the cationic and anionic barriers employed therein are not only expensive to manufacture, but they are quite fragile and subject to substantial attrition in use. On the other hand, in cells of Type I the ordinary permeable barriers, particularly those described of nylon fabric impregnated with cellulose acetate, are very economical to manufacture and are of rugged and simple construction, and have an exceedingly long life in use.

Another important discovery was made in carrying out these tests, with reference to the Type II cells 700 and 800 of FIGS. 4A and 4B, respectively, i.e., the resin beds in contact with the cationic and anionic barriers mechanically support these elements and reduce very substantially both breakage and attrition thereof in use.

Also, in these treatment tests, it was definitely established that electrolytic cells of Type I (100, 200, etc.) inherently operate at a considerably lower applied voltage than do electrolytic cells of Type II (600, 700, etc.); and moreover, that the cells of Type I develop during operation considerably less heat than do cells of Type II.

In a pair of reasonably comparable water treatment tests, respectively involving the cells 200 and 600, the following data was obtained establishing the above propositions:

| Cell | Rate of Demineralization, liter/hour | Effluent Hardness, p.p.m. | Voltage, Volts | Current, ma. | Heat Evolved, cal./sec. |
| --- | --- | --- | --- | --- | --- |
| 200 | 0.75 | 36 | 17 | 34 | 1.7 |
| 600 | 0.75 | 40 | 90 | 32 | 11.4 |

Accordingly, it is apparent that the conventional Type II cell (600 of FIG. 3) has a considerably lower voltage efficiency, and perhaps a slightly higher current efficiency, than the modified Type I cell with the mixed resin bed in the middle chamber (200 of FIG. 2A); whereby the overall power efficiency of the conventional Type II cell 600 is considerably lower than that of the modified Type I cell 200 embodying the present invention. In this connection voltage efficiency may be defined as the ratio of the minimum voltage required to discharge the ions upon the electrodes (ionization potentials, overvoltages, and concentration potentials across the membranes) to the voltage actually applied between the anode and the cathode of the cell; while current efficiency may be defined as the ratio of the number of Faradays, or electric charges, passing through the cell to the number of equivalents removed from the demineralized water.

Finally, in these treatment tests, it was established that the amount of gases evolved from the cells is generally related to the overall power efficiency thereof as indicated in the curves of FIGS. 7 and 8.

By way of a specific example, in the normal operation of the cell 200 of FIG. 2A, embodying the features of the present invention and carrying out the method thereof, it may be summarized that in the treatment of Chicago water, the hardness ions content may be reduced from 135 p.p.m. to 35 p.p.m. at a demineralization rate of 2.0 liters/hour at an energy expenditure at a rate of 2.6 watt-hours/liter, when an applied direct voltage of about 40 volts is impressed between the anode and the cathode producing a direct current of about 125 ma., effecting the generation of heat at a rate of about 10 calories/second in the cell, and evolving at the cathode of the cell only about 80 mls./hour of hydrogen gas, and evolving a total equivalent amount of mixed gases at the anode (oxygen, chlorine, etc.).

Considering now a water demineralizing system especially designed for home installation, and incorporating the inventive cell 200 of FIG. 2A, the mixed resin bed 201a provided in the center chamber 201 has a total ion exchange capacity appropriate to the total demands for demineralized water over a 24-hour period. The raw water to be demineralized is passed through the resin bed 201a intermittently in accordance with the intermittent demands for demineralized water in the home installation during the 24-hour period; whereby the rate of flow of the water through the mixed resin bed 201a is at a relatively high rate of flow, but only during the short time intervals of the several demands during the 24-hour period; and whereby the total demands for demineralized water from the system is not in excess of the total ion exchange capacity of the mixed resin bed 201a in the 24-hour period. In the arrangement, the raw water employed for the flushing purposes in the end chambers 202 and 203 may be supplied either continuously at a relatively low rate of flow or intermittently at a relatively high rate of flow during the 24-hour period mentioned, so that the total volumes of the electrolytes flushed through the end chambers 202 and 203 are adequate to effect the desired removal from the cell 200 to the exterior of the undesirable anions and cations during the 24-hour period, as previously explained.

In the 24-hour period mentioned, the direct voltage that is impressed between the anode 206 and the cathode 207 may be applied either continuously or intermittently, so as to produce a total Faraday current that is adequate to effect the desired electrodialysis in the center chamber 201 and the required regeneration of the resin bed 201a, as previously explained. In other words, in each 24-hour period, the regeneration of the mixed resin bed 201 effected by the Faraday current substantially matches the degeneration thereof effected by the demineralization of the raw water in the several demands for demineralized water. Accordingly, the direct voltage applied between the anode 206 and the cathode 207 may be concurrent, partially concurrent, or non-concurrent with a demand for demineralized water from the cell 200.

In view of the above explanation of the arrangement of a water demineralizing system, especially designed for home use and incorporating the inventive cell 200, it will be appreciated that in a similar manner the inventive cells 300, 700, 800 and 900 may be incorporated in such a water demineralizing system. In this connection, it is mentioned in conjunction with the inventive cell 900, that the supply of raw water to the two brine chambers 901 disposed intermediate the three treatment chambers 901 may be effected simultaneously with the supply of the raw water to the end chambers 902 and 903 in an obvious manner.

In view of the foregoing, it is apparent that there has been provided an improved method of and apparatus for demineralizing water that is very efficient and economical in operation and that involves an exceedingly simple arrangement of a minimum amount of equipment.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. The method of demineralizing water comprising: (1) conducting said water through and into contact with a porous ion exchange bed arranged in a first chamber and also into contact with first and second barriers respectively separating said first chamber from second and third chambers, wherein said porous ion exchange bed consists essentially of a loosely packed mass of first discrete particles of anion exchange material and of second discrete particles of cation exchange material and accommodates the ready passage therethrough of said water, (2) contacting said first barrier with a first electrolytic solution arranged in said second chamber, (3) contacting said second barrier with a second electrolytic solution arranged in said third chamber, and (4) passing a direct electric current from said first electrolytic solution into said second electrolytic solution through said first barrier and said water and said porous ion exchange bed and said second barrier; whereby said water in said first chamber is subjected simultaneously to anion exchange and to cation exchange and to electrodialysis.

2. The process of demineralizing water that comprises passing said water through and into contact with a porous ion exchange bed contained in an inner compartment of an electrolytic cell and separated from bodies of anolyte and catholyte by ion permeable membranes, wherein said bed consists essentially of a loosely packed particulate mixture of first discrete particles of anion exchange resin and of second discrete particles of cation exchange resin, and applying across said bed an electrical potential so as to subject said water in said inner compartment simultaneously to anion exchange and to cation exchange and to electrodialysis and so as to subject the resins in said bed to regeneration in situ by separate lateral displacement of sorbed anions and cations therefrom through said water in said inner compartment in contact therewith and respectively through said membranes into said anolyte and into said catholyte.

3. The process set forth in claim 2, wherein said electrical potential is applied continuously across said bed.

4. The process set forth in claim 2, wherein said anion exchange resin when fully regenerated is in the hydroxyl form, and said cation exchange resin when fully regenerated is in its hydrogen form.

5. The process set forth in claim 2, wherein the total anion exchange capacity of the anion exchange resin in said bed and the total cation exchange capacity of the cation exchange resin in said bed are substantially equivalent.

6. The process of demineralizing water that comprises passing said water through a bed of anion exchange resin and cation exchange resin contained in an inner compartment of an electrolytic cell and separated from bodies of anolyte and catholyte by ion permeable membranes, wherein said bed consists essentially of a loosely packed particulate mixture of first discrete particles of anion exchange resin and of second discrete particles of cation exchange resin, while maintaining across said bed of resins an electrical potential causing separate lateral displacement of anions and cations from said bed for regeneration of said resins.

7. The process of demineralizing water that comprises passing said water through a bed of anion exchange resin and cation exchange resin contained in an inner compartment of an electrolytic cell and separated from bodies of anolyte and catholyte by perm-selective membranes consisting respectively of anion exchange material and cation exchange material, wherein said bed consists essentially of a loosely packed particulate mixture of first discrete particles of anion exchange resin and of second discrete particles of cation exchange resin, while maintaining across said bed of resins an electrical potential causing separate lateral displacement of sorbed anions and cations from said bed for regeneration of said resins.

8. The process of demineralizing water that comprises passing said water through and into contact with a porous ion exchange bed and contained in an inner compartment of an electrolytic cell and separated from bodies of anolyte and catholyte by perm-selective membranes consisting respectively of anion exchange material and cation exchange material, wherein said bed consists essentially of a loosely packed particulate mixture of first discrete particles of anion exchange resin and of second discrete particles of cation exchange resin, and applying across said bed an electrical potential so as to subject said water in said inner compartment simultaneously to anion exchange and to cation exchange and to electrodialysis and so as to subject the resins in said bed to regeneration in situ by separate lateral displacement of sorbed anions and cations therefrom through said water in said inner compartment in contact therewith and respectively through said membranes into said anolyte and into said catholyte.

9. In apparatus for demineralizing water and including structure defining first and second and third chambers and provided with a first barrier as a common wall between said first and second chambers and a second barrier as a common wall between said first and third chambers; the combination comprising a first porous ion exchange bed arranged in said first chamber in interposed relation with respect to said first and second barriers and consisting essentially of a loosely packed particulate mixture of first discrete particles of anion exchange resin and of second discrete particles of cation exchange resin, first conduit means for conducting a stream of said water through said first chamber and also through and into contact with said first ion exchange bed and further into contact with said first and second barriers, an anode arranged in said second chamber, a second porous ion exchange bed arranged in said second chamber and disposed in contact with both said anode and said first barrier and characterized by both anion exchange and cation exchange, second conduit means for conducting a stream of a first electrolytic solution through said second chamber and also through and into contact with said second ion exchange bed and further into contact with both said anode and said first barrier, a cathode arranged in said third chamber, a third porous ion exchange bed arranged in said third chamber and disposed in contact with both said cathode and said second barrier and characterized by both anion exchange and cation exchange, third conduit means for conducting a stream of a second electrolytic solution through said third chamber and also through and into contact with said third ion exchange bed and further into contact with both said cathode and said second barrier, and means for passing a direct current from said anode to said cathode through said two barriers named and through said three ion exchange beds named and through said stream of water and through said two streams of electrolytic solutions named; whereby said stream of water while being conducted through said first chamber is subjected simultaneously to anion exchange and to cation exchange and to electrodialysis and said two streams of electrolytic solutions named while being conducted respectively through said second and third chambers are also subjected simultaneously to anion exchange and to cation exchange and to electrodialysis.

10. In apparatus for demineralizing water and including structure defining first and second and third chambers and provided with a first barrier as a common wall between said first and second chambers and a second barrier as a common wall between said first and third chambers; the combination comprising a first porous ion exchange bed arranged in said first chamber in interposed relation with respect to said first and second barriers and consisting essentially of a loosely packed particulate mixture of first discrete particles of anion exchange resin and of second discrete particles of cation exchange resin, first conduit means for conducting a stream of said water through said first chamber and also through and into contact with said first ion exchange bed and further into contact with said first and second barriers, an anode arranged in said second chamber, a second porous ion exchange bed arranged in said second chamber and disposed in contact with both said anode and said first barrier, second conduit means for conducting a first electrolytic solution through said second chamber and also through and into contact with said second ion exchange bed and further into contact with both said anode and said first barrier, a cathode arranged in said third chamber, a third porous ion exchange bed arranged in said third chamber and disposed in contact with both said cathode and said second barrier, third conduit means for conducting a second electrolytic solution through said third chamber and also through and into contact with said third ion exchange bed and further into contact with both said cathode and said second barrier, and means for passing a direct current from said anode to said cathode through said two barriers named and through said three ion exchange beds named and through said stream of water and through said two electrolytic solutions named; whereby said stream of water while being conducted through said first chamber is subjected simultaneously to anion exchange and to cation exchange and to electrodialysis and said two electrolytic solutions named respectively in said second and third chambers are also subjected simultaneously to ion exchange and to electrodialysis.

11. The apparatus set forth in claim 10, wherein said second ion exchange bed is also disposed between said anode and said first barrier and in embedding relation with respect to said anode, and said third ion exchange bed is also disposed between said cathode and said second barrier and in embedding relation with respect to said cathode.

12. The apparatus set forth in claim 10, wherein said second ion exchange bed consists essentially of anion exchange resin, and said third ion exchange bed consists essentially of cation exchange resin.

13. The apparatus set forth in claim 10, wherein said first barrier is perm-selective and is formed essentially of anion exchange material, and said second barrier is permselective and is formed essentially of cation exchange material.

14. In a raw water treatment system including structure defining anode and cathode chambers and respectively adjacent first and second treatment chambers and a flush chamber disposed between said treatment chambers, said structure being provided with a first membrane as a common wall between said anode chamber and said first treatment chamber and with a second membrane as a common wall between said cathode chamber and said second treatment chamber and with a third membrane as a common wall between said first treatment chamber and said flush chamber and with a fourth membrane as a common wall between said second treatment chamber and said flush chamber, each of said first and fourth membranes being anionic perm-selective accommodating the ready penetration thereof by anions to the substantial exclusion of cations, each of said second and third membranes being cationic perm-selective accommodating the ready penetration thereof by cations to the substantial exclusion of anions, an anode in said anode chamber, a cathode in said cathode chamber, and five individual conduit means for conducting five individual streams of raw water respectively through said five chambers named; the combination comprising two porous ion exchange beds respectively arranged in said two treatment chambers named and respectively disposed in the paths of the two corresponding streams of raw water respectively conducted therethrough, each of said two ion exchange beds named consisting essentially of a loosely packed mass of first discrete particles of cation exchange material and of second discrete particles of anion exchange material, and means for passing a direct electric current between said anode and said cathode and through said five streams of raw water named and said four membranes named and said two porous ion exchange beds named in series circuit relation; whereby the two streams of raw water respectively conducted through said two treatment chambers named are each subjected simultaneously to cation exchange and to anion exchange and to electrodialysis.

15. In a raw water treatment system including structure defining anode and cathode chambers and respectively adjacent first and second treatment chambers and a flush chamber disposed between said treatment chambers, said structure being provided with a first membrane as a common wall between said anode chamber and said first treatment chamber and with a second membrane as a common wall between said cathode chamber and said second treatment chamber and with a third membrane as a common wall between said first treatment chamber and said flush chamber and with a fourth membrane as a common wall between said second treatment chamber and said flush chamber, each of said first and fourth membranes being anionic perm-selective accommodating the ready penetration thereof by anions to the substantial exclusion of cations, each of said second and third membranes being cationic perm-selective accommodating the ready penetration thereof by cations to the substantial exclusion of anions, an anode in said anode chamber, a cathode in said cathode chamber, and five individual conduit means for conducting five individual streams of raw water respectively through said five chambers named; the combination comprising three porous ion exchange beds respectively arranged in said two treatment chambers named and in said flush chamber and respectively disposed in the paths of the three corresponding streams of raw water respectively conducted therethrough, each of said three ion exchange beds named consisting essentially of a loosely packed mass of first discrete particles of cation exchange material and of second discrete particles of anion exchange material, and means for passing a direct electric current between said anode and said cathode and through said five streams of raw water named and said four membranes named and said two porous ion exchange beds named in series circuit relation; whereby the two streams of raw water respectively conducted through said two treatment chambers named are each subjected simultaneously to cation exchange and to anion exchange and to electrodialylis.

16. In apparatus for treating a first electrolytic solution to modify its electrolytic concentration and including structure defining first and second and third chambers and provided with a first membrane as a common wall between said first and second chambers and a second membrane as a common wall between said first and third chambers, wherein said first membrane is anionic perm-selective accommodating the ready penetration thereof by anions to the substantial exclusion of cations, wherein said second membrane is cationic perm-selective accommodating the ready penetration thereof by cations to the substantial exclusion of anions, an anode in said second chamber, a cathode in said third chamber, first conduit means for conducting a stream of said first electrolytic solution through said first chamber and into contact with said first and second barriers, second conduit means for conducting a second electrolytic solution through said second chamber and into contact with said first barrier and said anode, and third conduit means for conducting a third electrolytic solution through said third chamber and into contact with said second barrier and said cathode; the combination comprising a first porous ion exchange bed arranged in said first chamber and saturated with said first electrolytic solution and engaging said first and second membranes, a second porous ion exchange bed arranged in said second chamber and saturated with said second electrolytic solution and engaging said first membrane, a third porous ion exchange bed arranged in said third chamber and saturated with said third electrolytic solution and engaging said second membrane, said first and second ion exchange beds engaging opposite sides of said first membrane, said first and third ion exchange beds engaging opposite sides of said second membrane, each of said three ion exchange beds named consisting essentially of a loosely packed mass of first discrete particles of cation exchange material and of second discrete particles of anion exchange material, and means for passing a direct electric current from said anode to said cathode and through said three electrolytic solutions named and said two membranes named and through said three beds named; whereby each of said three electrolytic solutions named is subjected simultaneously to cation exchange and to anion exchange and to electrodialysis.

References Cited in the file of this patent

UNITED STATES PATENTS

| | | |
|---|---|---|
| 2,636,852 | Juda et al. | Apr. 28, 1953 |
| 2,763,607 | Staverman | Sept. 18, 1956 |
| 2,815,320 | Kollsman | Dec. 3, 1957 |
| 2,906,684 | Stoddard | Sept. 29, 1959 |

FOREIGN PATENTS

| | | |
|---|---|---|
| 491,073 | Belgium | Sept. 12, 1949 |
| 675,253 | Great Britain | July 9, 1952 |
| 73,121 | Netherlands | Aug. 15, 1953 |

OTHER REFERENCES

Kosaka et al.: "Study in Continuous Exchanging of Ion," Journal of the Chemical Society of Japan, Industrial Chemistry Section, volume 55, pages 628 and 629.